United States Patent [19]
Arsem

[11] Patent Number: 4,588,857
[45] Date of Patent: May 13, 1986

[54] MESSAGE AGGREGATING DICTATION SYSTEM

[76] Inventor: A. Donald Arsem, 25 Northledge Dr., Snyder, N.Y. 14226

[21] Appl. No.: 539,175

[22] Filed: Oct. 5, 1983

[51] Int. Cl.[4] ............................................. H04M 1/64
[52] U.S. Cl. .................................. 179/6.06; 179/6.14; 369/29
[58] Field of Search ....................... 369/25, 26, 27, 28, 369/29; 179/6.01, 6.03, 6.06, 6.07, 6.08, 6.09, 6.11, 6.14, 6.17, 6.18, 6.20

[56] References Cited

U.S. PATENT DOCUMENTS

| | | | |
|---|---|---|---|
| 3,736,380 | 5/1973 | Shadd et al. | 179/6.07 |
| 4,221,933 | 9/1980 | Cornell et al. | 179/6.17 |
| 4,221,938 | 9/1980 | Mohammadioun et al. | 179/6.09 |
| 4,260,854 | 4/1981 | Kolodny et al. | 369/29 |
| 4,319,337 | 3/1982 | Sander et al. | 369/29 |
| 4,468,751 | 8/1984 | Plunkett, Jr. | 369/29 |
| 4,469,919 | 9/1984 | Nakamura et al. | 179/6.06 |

Primary Examiner—Donald McElheny, Jr.
Attorney, Agent, or Firm—Trexler, Bushnell & Wolters, Ltd.

[57] ABSTRACT

A message aggregation system employs a coder. Each message or piece of information to be recorded is accompanied by an audio or digital code. The messages or information are recorded or originated in operation serially. This information is aggregated in that all messages accompanied by one code are stored in a first memory or record/playback unit, with all messages following a second code being similarly stored etc., so that messages are aggregated. All of the messages relating to one particular code thus can be transcribed or accessed without the necessity of referring to other messages that are irrelevant thereto.

15 Claims, 5 Drawing Figures

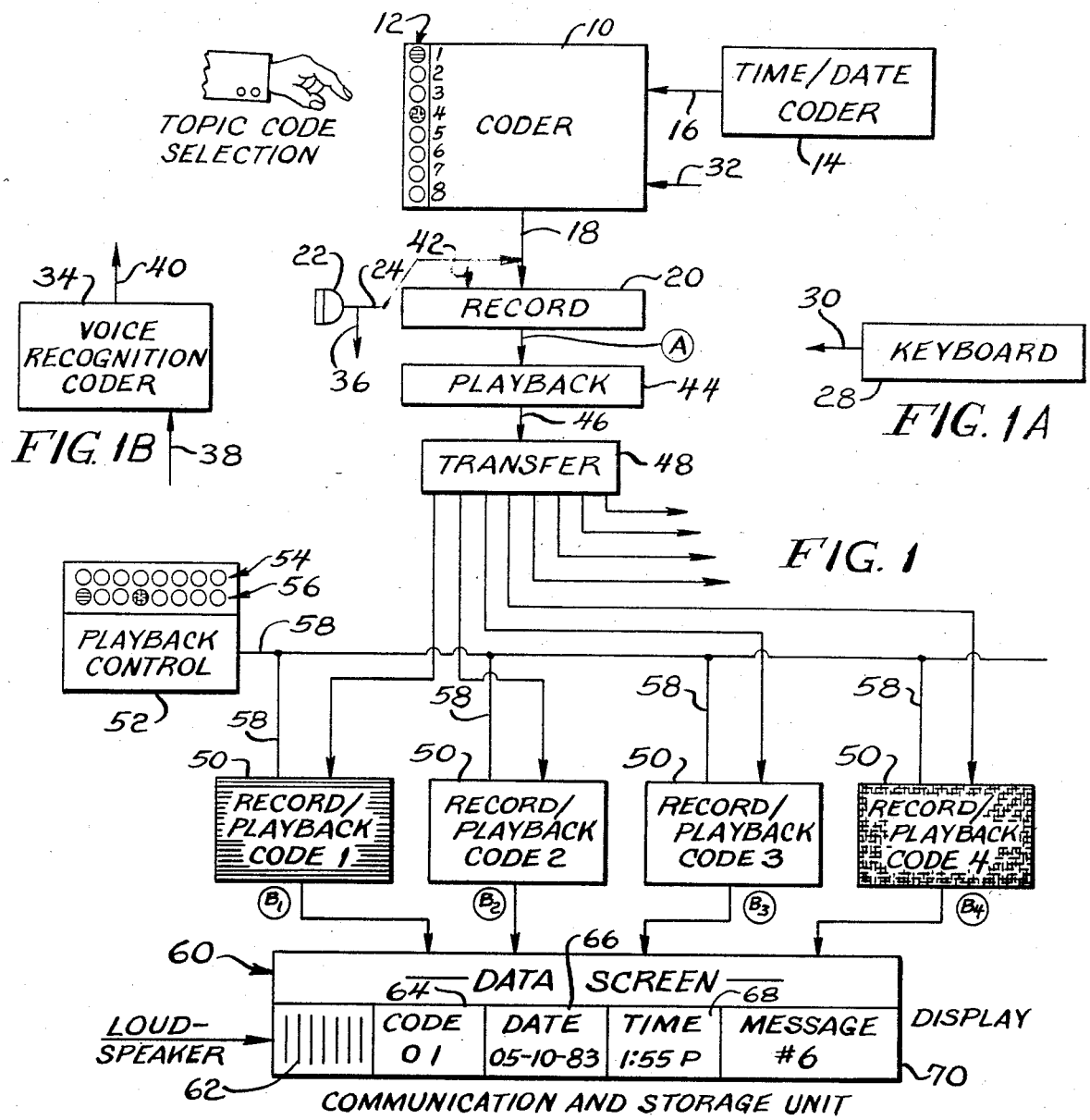
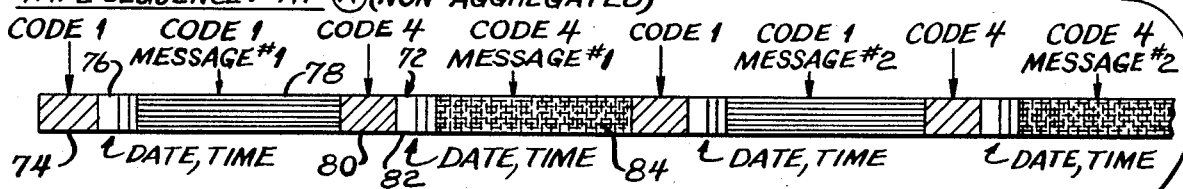
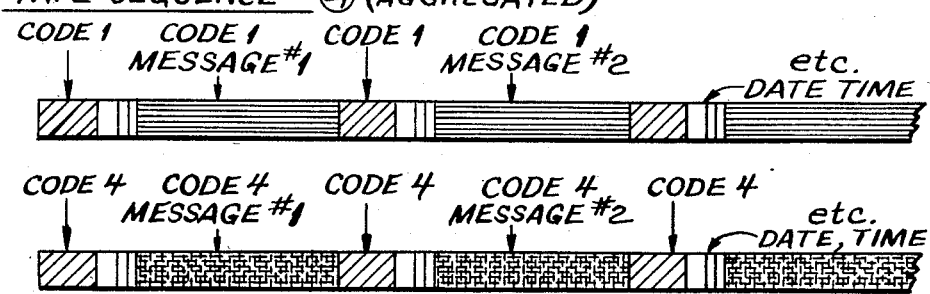

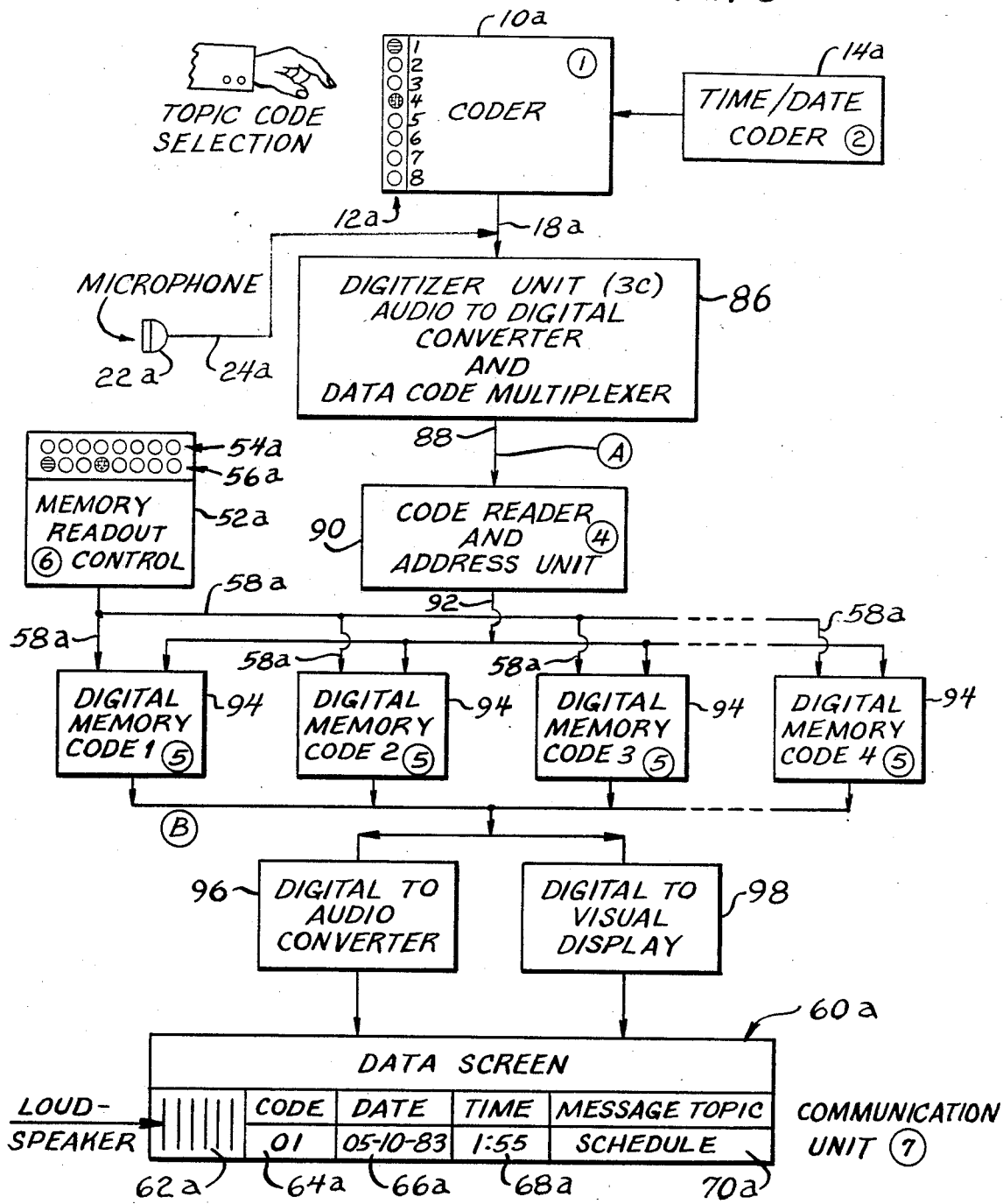

MESSAGE AGGREGATING DICTATION SYSTEM

BACKGROUND OF THE INVENTION

Many types of portable dictating machines are now in commercial use. Many people use such machines for the taking of notes, dictating letters, leaving messages, recording random thoughts on various subjects, reporting service or sales contracts, etc., at locations away from an office or central station.

Many such machines use standard size cassettes with a resulting recorder small enough to slip into a large pocket or briefcase. Other recording machines use the so-called microcassettes which will fit into much smaller pockets. There has recently been announced a commercial recorder of wrist watch size utilizing a RAM (random access memory).

All current recorders known to me suffer from a common disadvantage in that the information recorded plays back in the same sequence in which it is recorded. There may be several notes or messages regarding one subject, but spaced over an extended period on a cassette, for example. In order to place the information in proper sequence it is necessary to transcribe the entire cassette, and then to assemble or segregate the transcribed information relative to various subjects. The information then must be re-typed with regard to the various subjects. This is inefficient and time consuming. In a telephone answering system, messages from various callers must be heard in sequence.

OBJECTS AND SUMMARY OF THE PRESENT INVENTION

Accordingly, it is an object of this invention to provide a message aggregating dictation system in which recorded messages relative to a given subject or individual user play back selectively on demand from a recording medium.

More particularly, it is an object of the present invention to provide a message aggregating system in which an identifying code is entered in the recording medium typically before but alternatively during or after and each in any case associated with each message, with each message or recording information being aggregated as to code, and with desired messages relative to a selected code being played back upon demand by means of the code choice. With a remote system including a telephone the telephone tones can be used for this purpose.

In accordance with one embodiment of the present invention as hereinafter disclosed, a coder is provided having a plurality of push-buttons for different categories, and the user pushes one or more such buttons to provide a code identification on the recording medium to accompany the message that is recorded. As an alternative, a keyboard may be provided for entering word coding before each message is recorded. In a further embodiment of the invention, for use for example, in a conference recording, or over the telephone, a voice recognition coder may be employed. A code is entered orally whenever a person begins to speak, whereby each time that person speaks the same code is generated and recorded before the recording of his voice is made. In a further embodiment the speaker may state code words, letters or numbers in order to avoid having to press a button, such as in a mobile unit. At the present time alpha-numeric voice recognition and coding devices are known, but the present invention also contemplates use of an "oral fingerprint" type of recognition device.

Subsequently, playback and transfer apparatuses are provided along with a playback control so that all recorded material accompanied by a given code, no matter where it appears on the original recording medium, is sequentially recorded in a given record/playback mechanism corresponding to that specific code. There is one such record playback mechanism for each subject or user code.

A data screen is provided so that when it is desired to play back all recorded information with regard to a specific code the recorded information may be heard over a loudspeaker, and coded information may also appear in a visual display.

In the foregoing system the recordings are made on cassette or other tapes. In a further embodiment of the invention the recorded information is stored digitally in a RAM. An audio-to-digital convertor converts the audio tones to digital information for storage in the RAM. A data code automatically steers the recorded information to assigned RAMS or sections of a large RAM for recording of the information in accordance with the code in each case. The information thus may be aggregated without being first recorded sequentially. The digital information may be stored on a disc or other digital memory as an alternative to the RAM.

DRAWING DESCRIPTION

The invention will best be understood with reference to the ensuing specification when taken in accompaniment with the drawings wherein:

FIG. 1 is a schematic diagram illustrating the principles of the present invention as utilized with cassette tape recording;

FIG. 1A is a detail schematic view of a modification applicable to FIG. 1;

FIG. 1B is another detail schematic view of a further modification applicable to FIG. 1;

FIG. 2 is a diagrammatic display of the messages as recorded sequentially as aggregated; and FIG. 3 is a schematic view showing the principles of the present invention as applied to a digital recorder.

DETAILED DESCRIPTION OF THE DISCLOSED EMBODIMENT

Turning now in greater particularity to FIG. 1, there will be seen a coder 10 which generates a tone or digital signal under the control of a series of buttons 12 one of which is pushed immediately before the inception of dictation. Alternatively, the code could be entered after dictation, or even at an intermediate point, with the use of a simple buffer. A time/date coder 14 is connected to the coder 10 at 16 so that code is entered as to the time and date, as well as to the topic. The coder is connected at 18 to a serial recorder 20, which in the present example constitutes a cassette tape recorder. A microphone 22 is connected at 24 to communication line 18 to the recorder 20. The connection at 18 may be over a telephone line if used as an automatic telephone answering system, and the coder 10 can be the telephone Touch Tone coder.

The parts as heretofore shown and described comprise a portable or mobile unit, and may be a standard cassette recorder or a microcassette recorder. Alternatively, the recorder could be somewhat larger and built into an automobile. The recorder 20 can be associated with a telephone answering system.

The topic code selections in the foregoing example are limited to numerical codes by push-buttons 12. It is contemplated that an alpha-numeric keyboard 28 (FIG. 1A) could be utilized as an alternative, being connected as indicated at 30 and 32 to the coder to allow word coding for subjects as desired by the party doing the dictating, providing a better display information of subjects.

It is also within the contemplation of the present invention that recordings could be aggregated on the basis of the characteristics of each person's speech. Thus, in FIG. 1B there is shown a voice recognition coder 34. The microphone 22 is connected to the voice recognition coder as shown by the arrows 36 and 38 which can be a telephone line. The output of the voice recognition coder is connected directly to the recorder 20 as indicated by the arrows 40 and 42, the coder 10 being eliminated. The time/data coder 14 is also connected directly to the recorder 20. The user thus may introduce code information by speaking the code letter numbers or words which are recognized by the voice recognition coder and a signal is sent to the coder to provide a message code recorded on the serial recorder 20, sensing the same function as the button entry code system 12. This system can operate with a telephone answering system when the user has no button coder available.

The remainder of the system preferably comprises an office unit and includes first a playback system 44 which may be simply a cassette player. Messages and codes in the form of a cassette are transferred from the serial recorder 20 to the playback system 44 as indicated at A.

The transcribed information is fed at 46 to a code reader and transfer decision unit 48. This unit has as many outputs as there are code combinations in the coder 10, eight in the illustrative example. More would be supplied in connection with the alpha-numeric keyboard for word coding for subjects as in FIG. 1A. Eight outputs are shown as exemplary from the code reader and transfer decision unit 48, and these are respectively connected to a message aggregating record/playback apparatus or unit 50. Four such units are shown, but it will be understood that there would be eight in connection with the specific example herein.

The user can have a self contained aggregation unit similar to that just noted if he wishes to hear an aggregated message on a topic in order to make additions.

A playback control apparatus 52 is provided which provides a code recognizer and stepping command to read by message number, date and time, all, last or update. The playback control apparatus 52 is provided with a top row of push-buttons or other user operable controls 54, and with a lower row of playback code push-buttons 56. The playback control code push-buttons 56 correspond to the push-buttons 12 of the coder 10 and also to time and date, corresponding to the time/date coder 14. The output of the playback control unit 52 is connected in common at 58 to all of the record/playback units 50.

Each of the record/playback units 50 has an output, respectively indicated at $B_1$, $B_2$, $B_3$, and $B_4$ for the four units illustrated. These outputs are connected to a communication and storage unit 60. This unit includes a loudspeaker 62 for an audible reproduction of the material recorded in the units 50. It also includes a data screen which provides a visual display such as by LCDs (liquid crystal display), by cathode ray tube or other of information such as to code at 64, date at 66, time at 68, and the recorded message number at 70. The code number corresponds to the push-button depressed in the coder 10 or other in the case of the modifications of FIGS. 1A and 1B, while the date and the time are those impressed by the coder 14. The data screen further has a message section 70 which indicates the number of the recorded message thereon.

To use the foregoing apparatus the user depresses one of the buttons 12 and speaks into the microphone 22. For example, let us consider that the user depresses button No. 1, and this button has been shaded for the color yellow. No feature is claimed in the invention as to color, this being used only for correlation at various points in FIG. 1 and subsequently in FIG. 2. As the tape in the cassette starts running it picks up a short code section generated by the coder unit in response to the button selection made. To this is added a code in a second code band from the time/date coder 14. These codes and the speaker's comments are recorded in the record unit 20. The microphone may have a record button associated with it, or the serial recorder may be voice coded and activated. Several messages can be recorded in like fashion, each identified by its own code.

When it is desired to play back or transcribe the various messages the cassette is placed in the playback system 44. The code reader and transfer decision unit 48 causes every message headed by code 1 to be recorded in the first record/playback unit 50, labeled with code 1, and also lined as for yellow. All messages following code 2 are recorded in the second record/playback unit 50, also labeled with code 2. A similar practice is followed with each of the codes, and it will be noted that coder button 4 is shaded for blue, as is the fourth record/playback unit 50 noted as code 4.

When it is desired to read out all messages with regard to code 1, for example, the left most push-button 56 of the playback control 52 is depressed, and this causes the record/playback code 1 50 to have its output applied to the communication and storage unit, setting forth the messages in order through the loudspeaker, and also indicating the particular code number being used, the date, the time, and the number of the message. As will be appreciated, the cassette can be operated at high speed between messages encoded with a given code number, and then immediately be slowed to proper transcription speed.

As an example of how the messages are aggregated, reference should be made to FIG. 2. In the upper row of FIG. 2 there is a schematic representation of the cassette tape 72. The first area at 74 indicates the code number, for example, code 1. A second area 76 has coded information as to the date and time. Finally, a larger area 78 is devoted to the recorded message. Since in the exemplification it is a message following code 1 that is first shown the message information is shaded for the color yellow for consistency.

The next thing that will appear is a random code number from among the eight possible codes, and although this could again be code 1, or anything else, it is specifically illustrated at 80 as code 4. This is followed by an area 82 bearing the date and time information, and subsequently by a larger area 84 bearing the recorded message. The actual length of the recorded area may vary substantially from one example to another, and is shown as being equal from one to another simply for simplicity. This is followed by another code number area, again illustrated and lined as code 1, followed by another date and time area, and a message area. This is followed by yet another code area, this time indicated as code 4, in turn being followed by a time and date area, and finally a message area. The information is put down in serial order relative to the sequence in which it is recorded, and it may be quite random rather than the repetition shown in the top line of FIG. 2, and will, of course, go on much longer than what is illustrated in FIG. 2.

The second line in FIG. 2 shows that the messages are aggregated in the record/playback units 50, and particularly in the center line there is an illustration of all of the code 1 times, dates, and messages in time sequence as recorded. The middle line refers to code 1. A similar exemplification is shown in the bottom line of FIG. 2 in which all of the code 4 information is aggregated.

Accordingly, when it is desired to play back or transcribe all of the information or messages with regard to code 1, it is not necessary to go through the entire cassette as recorded in the record unit 20. All that is necessary is to push the appropriate push-button in the row 56 of the playback control, or also one of the buttons 54 if it is desired to play back only the messages recorded under a given code number on a particular date, or during a certain time interval.

The messages also can be aggregated as to time span, as well as to subject, speaker, etc. Codes preferably are provided from the coder 10 and the playback control 22 to effect erasure of the recorded messages at 20 and at 50.

A further embodiment of the present invention is shown in FIG. 3 and utilizes a RAM for recording the information rather than a cassette. Many of the parts are the same as or similar to the system disclosed in FIG. 1, and similar numerals with the addition of the suffix a are used to identify similar parts. One distinction is that the information at 18a from the coder 10a is applied to a digitizer unit (audio-to-digital convertor) and data code multiplexer 86, the microphone 22a being connected at 24a to the communication line 18a. The input from 24a and 18a could be in a direct form (code and audio) over a wire or a radio link to multiplexer 86 such as in an automatic telephone answering system. The information out of this apparatus 88 is applied to a code reader and address unit 90. However, there is indicated a transfer point A on the output line 88, and if it is desired to transcribe or access the information remotely, such as in an automatic telephone answering system, then the information can be transferred at this point to a tape or disc. The code reader and address unit 90 has an output at 92 connected to a plurality of digital memory units 94. Four such units are shown, but it will be appreciated that there would be eight as in the previous example, in accordance with eight push-buttons on the coder 10a. A common output line is shown, since the addressing feature of the unit 90 transfers the information to the appropriate digital memory 94 in accordance with the code number. In this connection the first digital memory unit 94 is indicated as code 1, the second is code 2, etc. The information stored in the digital memory 94 is aggregated, and the storage can be in a RAM or on a disc.

A memory readout control 52a is connected at 58a to the digital memories 94.

The digital memories 94 are in turn connected to the data screen 60a by a digital-to-audio convertor 96, and a digital-to-visual display convertor unit 98.

As will be appreciated, the information at point A is in serial form, as it was in connection with the first embodiment of the invention, while the information from the digital memories 94 as indicated at B is in the aggregated form as discussed in connection with the first embodiment of the invention.

Operation of the embodiment of the invention in FIG. 3 is the same as in FIG. 1, except that the information is recorded only in the digital memories 94 and in aggregated form. However, it will be appreciated that with transfer point A the information could be stored serially in a tape or disc, and then applied to the code reader and address unit at an office location for transcription or accessing remote to the recording scene.

A voice recognition coder or a keyboard can be incorporated with the system of FIG. 3 with modifications similar to those of FIGS. 1A and 1B.

It is again preferable that codes be provided at coder 10a and memory readout control 52a to effect erasure of selected recorded messages.

The specific examples of the invention as herein shown and described will be understood as being exemplary only. Various changes in structure will no doubt occur to those skilled in the art and are to be understood as forming a part of the present invention insofar as they fall within the spirit and scope of the appended claims.

The invention is claimed as follows:

1. Apparatus for aggregating messages comprising: first message recording means for serially recording messages, a plurality of second message recording units for recording aggregated messages, message originating means, coding means for selectively producing one of a plurality of codes, means for causing said coding means to produce a code associated with said origination of a message, message transmission means from said message originating means and said coding means to said first message recording means, playback means connected to said first recording means, transfer means connected to said playback means and to said second recording units and operated by said code to steer each message to a selected one of said second recording units, each message being recorded in a specific one of said recording units as steered by a respective code, and means connected to said recording units for selectively reading out messages recorded in a given recording unit as determined by a respective code.

2. Apparatus as set forth in claim 1 wherein the message originating means originates an audio message including data inputs, and wherein each recording unit comprises an audio recording unit.

3. Apparatus as set forth in claim 1 and further including time and date coding means connected to said transmission means and operable to record time and date codes in said message recording units.

4. Apparatus as set forth in claim 1 wherein said coding means comprises a voice recognition coder.

5. Apparatus as set forth in claim 1 wherein said coding means comprises a keyboard for word coding.

6. Apparatus as set forth in claim 1 wherein said reading out means comprises an audio-sound transducer and visual display means.

7. Apparatus as set forth in claim 1 wherein the first recording means is in an automatic telephone answering system connected in a telephone line.

8. Apparatus for aggregating messages comprising a serial recorder for recording a plurality of messages in the time order of receipt, message originating means connected to said serial recorder for recording messages thereon, coding means for selectively producing one of a plurality of codes, means interconnecting said coding means and said recorder for causing said coding means to produce a code associated with origination of a message to be recorded on said serial recorder, a plurality of messages thus being recorded and each identified by a code, playback means connected to said recorder for playing back the codes and messages recorded by said serial recorder, a plurality of message recorder units, code reading and transfer means interconnecting said playback means and said recording units for causing each message to be recorded in a selected one of said recording units according to the code by which it is identified, and means connected to said recording units for selectively reading out messages recording in said recording units as determined by a respective code.

9. Apparatus as set forth in claim 8 wherein said serial recorder comprises a tape recorder.

10. Apparatus as set forth in claim 8 and further including a playback control connected to said recording units and capable of generating the same codes as said coder for selectively playing back messages in a selected recording unit.

11. Apparatus as set forth in claim 10 wherein said playback control is programmed to sense selected codes for selectively reading out messages in a selected recording unit.

12. Apparatus as set forth in claim 10 wherein said playback control produces a code to effect erasure of selected messages.

13. Apparatus as set forth in claim 8 wherein said coding means provides audio tone codes.

14. Apparatus as set forth in claim 8 wherein said coding means includes means for converting voice inputs to code form.

15. Apparatus as set forth in claim 8 wherein said coding means provides digital codes.

* * * * *